United States Patent [19]

Mikamo et al.

[11] Patent Number: 5,008,152

[45] Date of Patent: Apr. 16, 1991

[54] INK COMPOSITION FOR THERMAL TRANSFER PRINTING AND FILM FOR THERMAL TRANSFER PRINTING

[75] Inventors: Hisanobu Mikamo, Ibaraki; Noboru Odani; Akio Shimizu, both of Takatsuki, all of Japan

[73] Assignee: Hitachi Maxell Ltd., Osaka, Japan

[21] Appl. No.: 377,968

[22] Filed: Jul. 11, 1989

[30] Foreign Application Priority Data

| | | | |
|---|---|---|---|
| Jul. 14, 1988 | [JP] | Japan | 63-175532 |
| Apr. 25, 1989 | [JP] | Japan | 64-106954 |

[51] Int. Cl.$^5$ .......................... B41M 5/26; C09D 11/00

[52] U.S. Cl. .......................... 428/423.1; 106/19; 106/31; 428/195; 428/480; 428/484; 428/488.1; 428/488.4; 428/522; 428/913; 428/914

[58] Field of Search .......................... 106/19, 31; 428/195, 428/423.1, 480, 484, 488.1, 488.4, 522, 913, 914

[56] References Cited

U.S. PATENT DOCUMENTS

| | | | |
|---|---|---|---|
| 4,894,283 | 1/1990 | Wehr | 428/341 |
| 4,935,300 | 6/1990 | Parker et al. | 428/352 |

*Primary Examiner*—Pamela R. Schwartz
*Attorney, Agent, or Firm*—Birch, Stewart, Kolasch & Birch

[57] ABSTRACT

An ink composition for thermal transfer printing, which composition comprises a coloring agent and a mixture of an aromatic ester-containing polyurethane and at least one thermoplastic material selected from the group consisting of thermoplastic resins and waxes, has a good transferring property and improved anti-blocking and forms printing having good durability.

8 Claims, 2 Drawing Sheets

INK COMPOSITION FOR THERMAL TRANSFER PRINTING AND FILM FOR THERMAL TRANSFER PRINTING

BACKGROUND OF THE INVENTION

1. Field of the Invention

The present invention relates to an ink composition for thermal transfer printing and a film for thermal printing such as an ink ribbon. More particularly, the present invention relates to improvement of a binder contained in an ink composition for thermal transfer printing.

2. Description of the Related Art

A film for thermal transfer printing is prepared by forming, on a substrate, a heat melting or softening ink layer which can be melt or softened by heat and transferred to other material (cf. Japanese Patent Kokai Publication No. 3919/1980). The ink layer can be heated with a thermal head or by Joule heat generated by applying an electric current through the substrate, and the substrate is so constructed as to be suitable for the heating manner.

However, heat transferred printing from the conventional films for thermal transfer printing have an insufficient durability of printing. For example, the printing is worn by mechanical friction, remelt or resoftened by frictional heat or increase of ambient temperature to lose their displaying function.

SUMMARY OF THE INVENTION

One object of the present invention is to provide an ink composition for thermal transfer printing which can form printing having good durability.

Another object of the present invention is to provide a film for thermal transfer printing, printing formed from which does not suffer from damages caused by mechanical friction or increase of ambient temperature and does not loose its displaying function.

Accordingly, the present invention provides a new ink composition for thermal transfer printing which composition comprises a coloring agent and a mixture of an aromatic ester-containing polyurethane and at least one thermoplastic material selected from the group consisting of thermoplastic resins and waxes as a binder, and a film for thermal transfer printing comprising a substrate and an ink layer comprising such ink composition. The ink composition may further comprise an ethylene-vinyl acetate copolymer as an additional binder component.

DETAILED DESCRIPTION OF THE INVENTION

Figure 1:
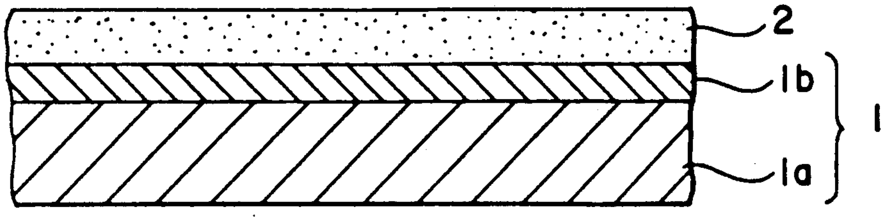
FIG. 1 is a cross section of a current application type film for thermal transfer printing according to the present invention.

The aromatic ester-containing polyurethane has a high visco-elasticity which is specific to polyurethanes and good binding force. Since the aromatic ester-containing polyurethane has a higher glass transition temperature than other polyurethanes because of the presence of aromatic ester linkages in the structure, it can provide a coating film having good abrasion resistance and heat resistance.

When the aromatic ester-containing polyurethane alone is used as the binder, the ink layer cannot be transferred to a material on which the printing is formed and no printing is formed, since the binder has too high glass transition temperature and too strong biding force.

According to the present invention, the aromatic ester-containing polyurethane is used in combination with at least one thermoplastic material selected from the group consisting of thermoplastic resins and waxes. Thereby, the ink can be transferred, and the durability of the formed printing is improved by taking advantage of the properties of the aromatic ester-containing polyurethane.

The aromatic ester-containing polyurethane is a polyurethane resin comprising an aromatic polyesterpolyol as a polyol component. The aromatic ester-containing polyurethane can be prepared by reacting an aromatic polyesterpolyol comprising at least one acid component (e.g. sodium 5-sulfoisophthalate, isophthalic acid, terephthalic acid, etc.) and at least one alcohol component (e.g. butanediol, neopentyl glycol, 1,6-hexanediol, 2-butene-1,4-diol, 3-chloro-1,2-propanediol, cyclohexanediol, 3-cyclohexene-1,1-dimethanol, decalindiol, etc.) with a diisocyanate such as an aromatic diisocyanate (e.g. tolylenediisocyanate, diphenylmethanediisocyanate, xylylenediisocyanate, etc.) and an aliphatic diisocyanate (e.g. hexamethylenediisocyanate, isophoronediisocyanate, methylenebis(4-cyclohexylisocyanate), etc.). To adjust the glass transition temperature, the aromatic ester-containing polyurethane may contain polyesterpolyol (e.g. polybutylene adipate, polyhexamethylene adipate, polyethylene adipate, etc.), polycaprolactone or polyetherpolyol (e.g. polytetramethylene glycol, polyethylene glycol, polypropylene glycol, etc.). Examples of the commercially available aromatic ester-containing polyurethane are Vilon UR-8200 (a trade name) (polyurethane resin prepared by reacting a polyol component comprising isophthalic acid, terephthalic acid and neopentyl glycol with diphenylmethanediisocyanate), Vilon UR-8300 (a trade name) (polyurethane resin prepared by reacting a polyol component comprising caprolactone, isophthalic acid and neopentyl glycol with diphenylmethanediisocyanate) and the like.

The urethane content in the aromatic ester-containing polyurethane is from 0.5 to 3 mol/g, preferably from 1 to 2 mol/g. The aromatic content is from 0.05 to 6 mol/g, preferably from 3 to 5.5 mol/g. When the urethane content is less than 0.5 mol/g, sufficient binding force is not provided. When the urethane content is larger than 3 mol/g, the ink layer becomes too tacky to cause blocking. When the aromatic content is less than 0.05 mol/g, the transferred printing does not have sufficient strength. When the aromatic content is larger than 6 mol/g, the polyurethane has a very high glass transition temperature and very high melting point, so that the ink layer cannot be transferred by heating.

Examples of the thermoplastic resins are petroleum resin, aliphatic polycarbonate, polyamide, low molecular weight polyethylene, etc. Examples of the waxes are paraffin wax, microcrystalline wax, Ouricury wax, etc.

A mixing ratio of the aromatic ester-containing polyurethane and the thermoplastic material varies with the heating manner for transferring the ink, kinds of the thermoplastic material and the like. To have the ink adapted for both heating with applied electric current and heating with the thermal head, the amount of the aromatic ester-containing polyurethane is preferably from 5 to 90% by weight based on the total weight of the binder. When the amount of the aromatic ester-containing polyurethane is too small, the durability of the transferred printing cannot be improved. When the amount of the aromatic ester-containing polyurethane is too large, the transfer of the ink becomes difficult so that the image is difficultly created. In case of the heating with the applied electric current, the amount of the aromatic ester-containing polyurethane can be increased up to 95% by weight based on the total weight of the binder.

The ink composition can be prepared by mixing a coloring agent and the above described specific binders as essential components and optionally a parting agent, a dispersant and the like. The coloring agent may be any of conventional ones such as carbon black. The amount of the coloring agent is from 2 to 40% by weight based on the total weight of the ink composition. When the ink layer is formed on the substrate by a so-called solvent coating method, the components of the ink compositions are dissolved or dispersed in a solvent to form an ink paint.

As described above, the use of the aromatic ester-containing polyurethane as the binder improves the durability of transferred printing. Since the aromatic ester-containing polyurethane has a high melting point, a high glass transition temperature and large binding force, the ink containing such polyurethane has poor transferring properties onto the material to be printed. To overcome such drawback of the aromatic ester-containing polyurethane, the present invention uses the thermoplastic material such as the thermoplastic resin or the wax. However, the thermoplastic material causes blocking when the ink ribbon for thermal transfer printing is wound on a reel and stored at high temperature. Namely, the ink layer is adhered to a back face of the substrate wound on said ink layer and peeled off from the substrate.

When the high quality of transferring property and/or the anti-blocking are required, the ink composition comprising the aromatic ester-containing polyurethane and the thermoplastic material is not necessarily satisfactory.

In such case, an ethylene-vinyl acetate copolymer is preferably added to the ink composition comprising the aromatic ester-containing polyurethane and the thermoplastic material to improve the transferring property and suppress the blocking of the ink layer, since the ethylene-vinyl acetate copolymer has large cohesive force and small melt surface tension and further good adhesiveness because of the presence of vinyl acetate units.

When the ethylene-vinyl acetate copolymer is added to the ink composition as one of the binder components, the transferring property of the ink layer and adhesiveness between the ink and the material to be printed are improved. In addition, the ethylene-vinyl acetate copolymer increases the cohesiveness of the ink layer and adhesiveness between the ink layer and the substrate. Then, the anti-blocking is improved.

When the amount of the ethylene-vinyl acetate copolymer to be used is too small, the transferring property and the anti-blocking are not improved sufficiently. When said amount is too large, the adhesiveness of the ink layer is too strong so that the anti-blocking and the transferring property are deteriorated. Therefore, the amount of the ethylene-vinyl acetate is 3 to 40% by weight based on the total weight of the binder components.

Since the adhesiveness of the ethylene-vinyl acetate copolymer is much influenced by the content of vinyl acetate in the copolymer. Preferably, the content of vinyl acetate is from 5 to 50% by weight of the copolymer weight. When the vinyl acetate content is less than 5% by weight, the adhesion effect is not obtained. When the vinyl acetate content is larger than 50% by weight, the copolymer becomes tacky so that the anti-blocking is adversely affected. In addition, when the vinyl acetate content is large, crystallinity of the copolymer decreases so that response to heat is reduced.

When a melt index of the ethylene-vinyl acetate copolymer is smaller than 30 g/10 min., flowability of the ink composition during transferring is deteriorated so that the transferring property becomes worse. When the melt index of the copolymer is larger than 2,500 g/10 min., the flowability of the copolymer becomes too large so that the printing is deformed.

The ink composition comprising the ethylene-vinyl acetate copolymer may be prepared by mixing the essential components, namely the coloring agent, the thermoplastic material, the aromatic ester-containing polyurethane and the ethylene-vinyl acetate copolymer as well as optional components such as the parting agent, the dispersant and the like. In this ink composition, the content of the coloring agent is from 2 to 40% by weight of the whole ink composition.

When the ink layer is formed by the solvent coating method, the ink components are dissolved or dispersed in the solvent to prepare the ink paint.

PREFERRED EMBODIMENTS OF THE INVENTION

The present invention will be illustrated by following Examples, in which "parts" and "%" are by weight unless otherwise indicated.

Example 1

The aromatic ester-containing polyurethane (Vilon UR-8200 of Toyobo. See above) and, as the thermoplastic resin, the aliphatic polycarbonate comprising the hexamethylene repeating units and having a number average molecular weight of about 1,500 (S-8200 manufactured by Asahi Glass) were mixed in the amounts specified in Table 1. Then, the mixture (5 parts) and carbon black (1 part) were added to methyl ethyl ketone (20 parts) and dispersed in a ball mill for 100 hours to prepare an ink paint.

In the separate step, the aromatic polycarbonate (Taflon A 3000, a trade name of Idemitsu Petrochemical) (70 parts) and electrically conductive carbon black (Vulcan XC-72, a trade name of Cavot, U.S.A.) (30 parts) were added to methylene chloride (200 parts) and dispersed in a ball mill. The dispersion was coated on a carrier film made of a polyethylene terephthalate film of 75 μm in thickness and dried to form a resistance layer of 15 μm in thickness. On the resistance layer, aluminum was evaporated to form a conductive layer of 100 nm (1,000 Å) in thickness.

Then, on the conductive aluminum layer, the ink paint was coated with a wire bar and dried to form an ink layer of 3 μm in thickness. After through drying of the ink layer, the carrier film was peeled off from the resistance layer to produce a current application type film for thermal transfer printing in which the substrate was formed from the resistance layer and the conductive layer. A cross section of this film is shown in FIG. 1, which comprises the substrate 1 and the ink layer 2. The substrate 1 consists of the resistance layer 1*a* which is made of the mixture of the aromatic polycarbonate and the conductive carbon black and the conductive layer 1*b* which is made from the ink composition containing the aromatic ester-containing polyurethane and the aliphatic polycarbonate as the binder components.

By using this film, images were printed on a sheet of paper having a Bekk smoothness of 50 seconds. The printing was carried as follows:

The ink layer 2 was contacted to the paper surface. Then, a tungsten needle electrode of 75 μm in diameter and a return electrode both connected to a power source were contacted to the resistance layer la. By applying electric current at 20 V, 30 mA for 0.5 millisecond per dot, spot images of 100 μm in diameter were transferred to the paper with 40 dots in vertical and 25 dots in horizontal so as to print a "Z" character.

After printing, the surface of the printed image was rubbed at 20° C., 50° C. or 80° C. with a rubber eraser 5,000 times while applying a load of 1 kg/cm$^2$ on the eraser, and the condition of the image was observed. The results are shown in Table 1.

As the material on which the images were printed, an OHP (overhead projection) film having a Bekk smoothness of 20,000 seconds was used, and dots were transferred in the same manner as above. Then, the image surface was rubbed with the rubber eraser in the same way as above. Durability of the image of "Z" character was evaluated. The results are shown in Table 1.

As understood from the results of Table 1, the durability of the image increases as the content of the aromatic ester-containing polyurethane increases. When the content of the aromatic ester-containing polyurethane is in the range from 5 to 95%, the current application type film for thermal transfer printing of Example 1 created the images having good durability irrespective of the test temperature.

TABLE 1

| Sample No. | Binder composition (parts): Aromatic ester-containing polyurethane | Binder composition (parts): Aliphatic polycarbonate | Content of aromatic ester-containing polyurethane in binder (%) | Durability of image*1 Paper 20° C. | Paper 50° C. | Paper 80° C. | OHP film 20° C. | OHP film 50° C. | OHP film 80° C. |
|---|---|---|---|---|---|---|---|---|---|
| 1 | 0 | 100 | 0 | C | C | C | C | C | C |
| 2 | 1 | 99 | 1 | B | B | C | B | C | C |
| 3 | 3 | 97 | 3 | A | A | B | B | B | B |
| 4 | .5 | 95 | 5 | A | A | A | A | A | A |
| 5 | 30 | 70 | 30 | A | A | A | A | A | A |
| 6 | 90 | 10 | 90 | A | A | A | A | A | A |
| 7 | 95 | 5 | 95 | A | A | A | A | A | A |
| 8 | 100 | 0 | 100 | — | — | — | — | — | — |

Note:
*1Criteria for evaluating the durability of image:
A: No blur.
B: Partly blur.
C: Blur.
D: —: No image could be transferred.

Example 2

Figure 2:
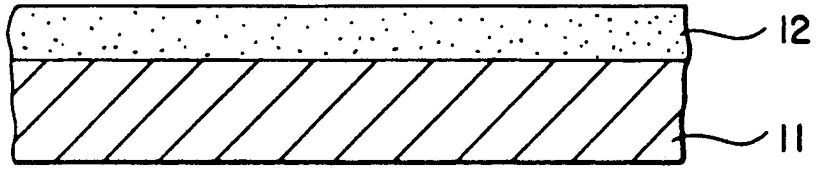
FIG. 2 is a cross section of a thermal head heating type film for thermal transfer printing according to the present invention.

On a polyethylene terephthalate film of 3.5 μm in thickness, the same ink paint as prepared in Example 1 was coated and dried to form an ink layer of 3 μm in thickness. Thereby, a film for thermal transfer printing which is heated with a thermal head was produced. A cross section of this film is shown in FIG. 2. The film comprises a substrate 11 and an ink layer 12.

Then, a ribbon formed from this film was set in a thermal printer, and dot images (24×24 dots) were transferred onto a sheet of paper having a Bekk smoothness of 50 seconds or an OHP film. Then, the durability of the images was examined in the same manner as in Example 1. The results are shown in Table 2.

As understood from the results of Table 2, the durability of the image increases as the content of the aromatic ester-containing polyurethane increases. When the content of the aromatic ester-containing polyurethane is in the range from 5 to 95%, the thermal head heating type film for thermal transfer printing of Example 2 created the images having good durability irrespective of the test temperature as seen from Sample Nos. 14 through 16.

TABLE 2

| Sample No. | Binder composition (parts): Aromatic ester-containing polyurethane | Binder composition (parts): Aliphatic polycarbonate | Content of aromatic ester-containing polyurethane in binder (%) | Durability of image*1 Paper 20° C. | Paper 50° C. | Paper 80° C. | OHP film 20° C. | OHP film 50° C. | OHP film 80° C. |
|---|---|---|---|---|---|---|---|---|---|
| 11 | 0 | 100 | 0 | C | C | C | C | C | C |
| 12 | 1 | 99 | 1 | B | B | C | B | C | C |
| 13 | 3 | 97 | 3 | A | A | B | B | B | B |
| 14 | 5 | 95 | 5 | A | A | A | A | A | A |
| 15 | 30 | 70 | 30 | A | A | A | A | A | A |
| 16 | 90 | 10 | 90 | A | A | A | A | A | A |
| 17 | 95 | 5 | 95 | — | — | — | — | — | — |

TABLE 2-continued

| Sample No. | Binder composition (parts): Aromatic ester-containing polyurethane | Binder composition (parts): Aliphatic polycarbonate | Content of aromatic ester-containing polyurethane in binder (%) | Durability of image*1 Paper 20° C. | Paper 50° C. | Paper 80° C. | OHP film 20° C. | OHP film 50° C. | OHP film 80° C. |
|---|---|---|---|---|---|---|---|---|---|
| 18 | 100 | 0 | 100 | — | — | — | — | — | — |

Note:
*1 Criteria for evaluating the durability of image:
A: No blur.
B: Partly blur.
C: Blur.
D: —: No image could be transferred.

Example 3

The aromatic ester-containing polyurethane (Vilon UR-8200 used in Example 1) and the aliphatic polycarbonate (S-8200 used in Example 1) were mixed in the weight ratio of 1:1, and the mixture was blended with the ethylene-vinyl acetate copolymer (Nipoflex 750, a trade name of Toso. Vinyl acetate content of 32%. Melt index of 30 g/10 min.) in a ratio shown in Table 3.

Then, a ternary mixture of the aromatic ester-containing polyurethane, the aliphatic polycarbonate and the ethylene-vinyl acetate (5 parts) and carbon black (1 part) was added to methyl ethyl ketone (20 parts) and dispersed in a ball mill for 100 hours to prepare an ink paint.

Then, in the same manner as in Example 1, a current application type film for thermal transfer printing was produced.

Transferring properties and anti-blocking of the ink were both examined by the method A (general test conditions) and the method B (severe test conditions) as follows:

Method A for evaluating the transfer property

As a material on which images are transferred, a sheet of paper having a Bekk smoothness of 50 seconds is used. The current application type film for thermal transfer printing is contacted to the paper. Then, a tungsten needle electrode of 75 μm in diameter and a return electrode both connected to a power source are contacted to the resistance layer. By applying electric current at 20 V, 30 mA for 0.5 millisecond per dot, a checkerwise pattern is printed at a printing speed of 10 cm/sec. Then, the printed pattern is observed to find whether or not any transfer irregularity is present.

Figure 3A:
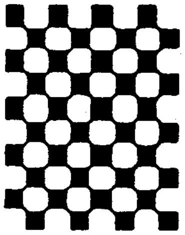
FIGS. 3A–C show criteria for evaluating the transferring property, and FIG. 4 schematically shows the manner for winding the slit sample (ribbon) of the film for thermal transfer printing in order to evaluate the anti-blocking.
Figure 3B:
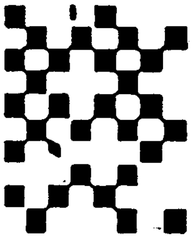
Figure 3C:
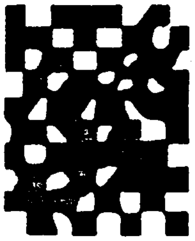

FIG. 3 shows criteria for evaluating the transferring property, in which (a) is good, and (b) and (c) are poor.

Method B for evaluating the transferring property

In the same manner as in the above method A but using an OHP film having a Bekk smoothness of 20,000 seconds, a checkerwise pattern is printed and its irregularity is observed.

Method A for evaluating anti-blocking

Figure 4:
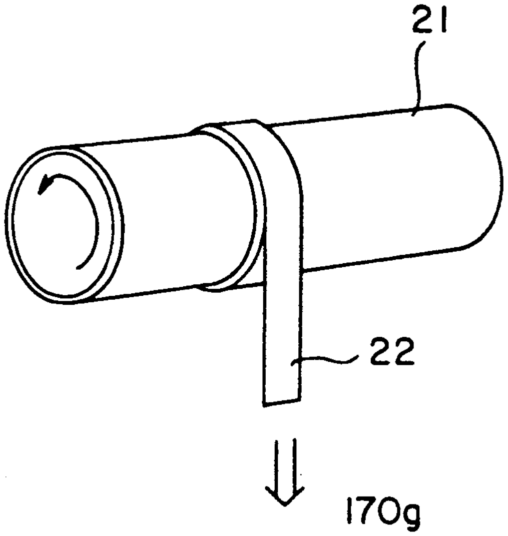

The film for thermal transfer printing is slit to a width of 12.5 mm to form an ink ribbon. As shown in FIG. 4, while applying a load of 170 g (3.8 kg/mm$^2$) at one end, the sample 22 of one meter in length is wound around a glass tube 21 of 35 mm in outer diameter with placing the ink layer inside. The other end of the sample is adhered with a mending tape. The wound sample is kept in a constant temperature bath kept at 55° C. for 72 hours and then cooled to room temperature. The cooled sample is unwound and inspected to find whether or not blocking occurs.

Method B for evaluating anti-blocking

In the same manner as in the method A but heating the wound sample at 60° C. for 120 hours, the anti-blocking is evaluated.

The results are shown in Table 3.

As understood from the results for Sample Nos. 22 through 26, when the content of the ethylene-vinyl acetate copolymer in the binder is from 3 to 40% by weight, both the transferring property and the anti-blocking are good even under the severe test conditions. Sample No. 21 has good transferring property and anti-blocking according to the methods A under general test condition, while it has poor transferring property and anti-blocking according to the methods B under the severe condition.

TABLE 3

| Sample No. | Binder composition (parts): Mixture of polyurethane and polycarbonate | Binder composition (parts): Ethylene-vinyl acetate copolymer | Content of ethylene-vinyl acetate copolymer in binder (%) | Transferring property Method A | Transferring property Method B | Anti-blocking*1 Method A | Anti-blocking*1 Method B |
|---|---|---|---|---|---|---|---|
| 21 | 100 | 0 | 0 | Good | Poor | No | Yes |
| 22 | 97 | 3 | 3 | Good | Good | No | No |
| 23 | 95 | 5 | 5 | Good | Good | No | No |
| 24 | 70 | 30 | 30 | Good | Good | No | No |
| 25 | 65 | 35 | 35 | Good | Good | No | No |
| 26 | 60 | 40 | 40 | Good | Good | No | No |
| 27 | 55 | 45 | 45 | Good | Good | No | Yes |
| 28 | 50 | 50 | 50 | Poor | Poor | Yes | Yes |

Note:
*1 Criteria for evaluating the anti-blocking:
No: No blocking.
Yes: Blocked.

The durability of image printed with the current application type film for thermal transfer printing will be examined.

In the same manner as in Example 1, the image was printed on a sheet of paper having the Bekk smoothness of 50 seconds or the OHP film and rubbed with the rubber eraser at 20° C., 50° C. or 80° C. The results are shown in Table 4.

As understood from the results of Table 4, the durability of image was good. But, Sample No. 28 had poor transferring property so that no image was transferred and durability of image could not be evaluated.

TABLE 4

| Sample No. | Binder composition (parts): Mixture of polyurethane and polycarbonate | Binder composition (parts): Ethylene-vinyl acetate copolymer | Content of ethylene-vinyl acetate copolymer in binder (%) | Durability of image*[1] Paper 20° C. | Paper 50° C. | Paper 80° C. | OHP film 20° C. | OHP film 50° C. | OHP film 80° C. |
|---|---|---|---|---|---|---|---|---|---|
| 21 | 100 | 0 | 0 | A | A | A | A | A | A |
| 22 | 97 | 3 | 3 | A | A | A | A | A | A |
| 23 | 95 | 5 | 5 | A | A | A | A | A | A |
| 24 | 70 | 30 | 30 | A | A | A | A | A | A |
| 25 | 65 | 35 | 35 | A | A | A | A | A | A |
| 26 | 60 | 40 | 40 | A | A | A | A | A | A |
| 27 | 55 | 45 | 45 | A | A | A | A | A | A |
| 28 | 50 | 50 | 50 | — | — | — | — | — | — |

Note:
*[1]Criteria for evaluating the durability of image:
A: No blur.
B: Partly blur.
C: Blur.
D: —: No image could be transferred.

Example 4

The same ink paint as used in Example 3 was coated on a polyethylene terephthalate film and dried to form an ink layer of 3 μm in thickness. Thereby, a thermal head heating type film for thermal transfer printing having a cross section of FIG. 2 was produced.

The transferring property and anti-blocking property of the coated ink were evaluated in substantially the same manners as in Example 3 but, in the evaluation of transferring property, the image was transferred to the paper or the OHP film with a heat transfer printer PT-100 M (manufactured by Hitachi) at a printing speed of 40 cps.

The results are shown in Table 5.

As understood from the results for Sample Nos. 32 through 36, when the content of the ethylene-vinyl acetate copolymer in the binder is from 3 to 40% by weight, both the transferring property and the anti-blocking are good even under the severe test condition. Sample No. 31 has good transferring property and anti-blocking according to the methods A under general test condition, while it has poor transferring property and anti-blocking according to the methods B under the severe condition.

TABLE 5

| Sample No. | Binder composition (parts): Mixture of polyurethane and polycarbonate | Binder composition (parts): Ethylene-vinyl acetate copolymer | Content of ethylene-vinyl acetate copolymer in binder (%) | Transferring property Method A | Transferring property Method B | Anti-blocking*[1] Method A | Anti-blocking*[1] Method B |
|---|---|---|---|---|---|---|---|
| 31 | 100 | 0 | 0 | Good | Poor | No | Yes |
| 32 | 97 | 3 | 3 | Good | Good | No | No |
| 33 | 95 | 5 | 5 | Good | Good | No | No |
| 34 | 70 | 30 | 30 | Good | Good | No | No |
| 35 | 65 | 35 | 35 | Good | Good | No | No |
| 36 | 60 | 40 | 40 | Good | Good | No | No |
| 37 | 55 | 45 | 45 | Good | Good | No | Yes |
| 38 | 50 | 50 | 50 | Poor | Poor | Yes | Yes |

Note:
*[1]Criteria for evaluating the anti-blocking:
No: No blocking.
Yes: Blocked.

The durability of image printed with the current application type film for thermal transfer printing will be examined.

In the same manner as in Example 2, the image was printed on a sheet of paper having the Bekk smoothness of 50 seconds or the OHP film and rubbed with the rubber eraser at 20° C., 50° C. or 80° C. The results are shown in Table 6.

As understood from the results of Table 6, the durability of image was good. But, Sample No. 38 had poor transferring property so that no image was transferred and durability of image could not be evaluated.

TABLE 6

| Sample No. | Binder composition (parts): Mixture of polyurethane and polycarbonate | Binder composition (parts): Ethylene-vinyl acetate copolymer | Content of ethylene-vinyl acetate copolymer in binder (%) | Durability of image*1 Paper 20° C. | Paper 50° C. | Paper 80° C. | OHP film 20° C. | OHP film 50° C. | OHP film 80° C. |
|---|---|---|---|---|---|---|---|---|---|
| 31 | 100 | 0 | 0 | A | A | A | A | A | A |
| 32 | 97 | 3 | 3 | A | A | A | A | A | A |
| 33 | 95 | 5 | 5 | A | A | A | A | A | A |
| 34 | 70 | 30 | 30 | A | A | A | A | A | A |
| 35 | 65 | 35 | 35 | A | A | A | A | A | A |
| 36 | 60 | 40 | 40 | A | A | A | A | A | A |
| 37 | 55 | 45 | 45 | A | A | A | A | A | A |
| 38 | 50 | 50 | 50 | — | — | — | — | — | — |

Note:
*1Criteria for evaluating the durability of image:
A: No blur.
B: Partly blur.
C: Blur.
D: —: No image could be transferred.

What is claimed is:

1. An ink composition for thermal printing, which composition comprises a coloring agent and a mixture of an thermoplastic material selected from the group consisting of thermoplastic resins and waxes as a binder.

2. The ink composition according to claim 1, wherein the amount of the aromatic ester-containing polyurethane is from 5 to 90% by weight based on the total weight of binder components.

3. The ink composition according to claim 1, which further comprises an ethylene-vinyl acetate copolymer as an additional binder component.

4. The ink composition according to claim 3, wherein the amount of the ethylene-vinyl acetate copolymer is from 3 to 40% by weight based on the total weight of the binder components.

5. A film for thermal transfer printing comprising a substrate and an ink layer which is formed on a surface of the substrate from an ink composition comprising a coloring agent and a mixture of an aromatic ester-containing polyurethane and at least one thermoplastic material selected from the group consisting of thermoplastic resins and waxes as a binder.

6. The film for thermal transfer printing according to claim 5, wherein the amount of the aromatic ester-containing polyurethane is from 5 to 90% by weight based on the total weight of binder components.

7. The film for thermal transfer printing according to claim 5, wherein the ink composition further comprises an ethylene-vinyl acetate copolymer as an additional binder component.

8. The film for thermal transfer printing according to claim 7, wherein the amount of the ethylene-vinyl acetate copolymer in the ink composition is from 3 to 40% by weight based on the total weight of the binder components.

* * * * *